J. T. TRUMBLE.
PISTON.
APPLICATION FILED FEB. 8, 1915.

1,163,710. Patented Dec. 14, 1915.

WITNESSES:
Karl H. Butler
Chas. W. Stauffiger

INVENTOR
John T. Trumble,
BY
ATTORNEYS

UNITED STATES PATENT OFFICE.

JOHN T. TRUMBLE, OF FLINT, MICHIGAN.

PISTON.

1,163,710.

Specification of Letters Patent.  Patented Dec. 14, 1915.

Application filed February 8, 1915. Serial No. 6,744.

*To all whom it may concern:*

Be it known that I, JOHN T. TRUMBLE, a citizen of the United States of America, residing at Flint, in the county of Genesee and State of Michigan, have invented certain new and useful Improvements in Pistons, of which the following is a specification, reference being had therein to the accompanying drawings.

This invention relates to pistons, and more particularly to that type used in connection with gasolene engines or motors. With this type of piston considerable trouble is experienced by what is commonly styled "piston slapping", caused by the piston being unequally balanced in a cylinder, by wear and tear, and due to inequalities at the connection of the piston with its connecting rod.

To compensate for piston slapping, stresses and strains upon the piston, and noise and wear and tear incident thereto, is the principal object of my invention, which is accomplished by furnishing a piston body with a yieldable or resilient take-up member that causes the piston body to hug or snugly engage a wall of a cylinder.

My invention will be better understood from the following description, taken in connection with the drawings, wherein—

Figure 1:
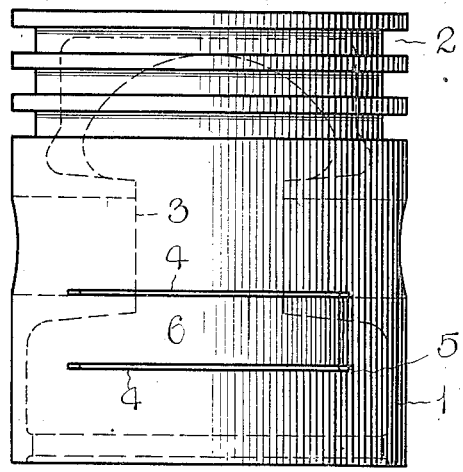
Figure 4:
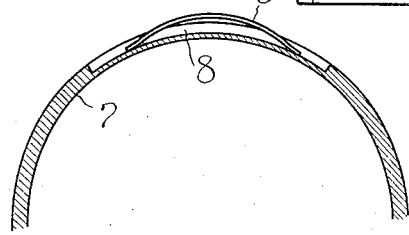
Figure 3:
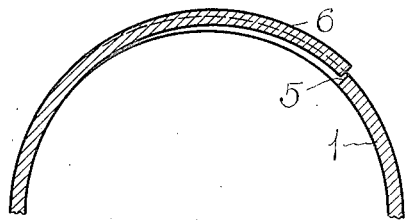
Figure 2:
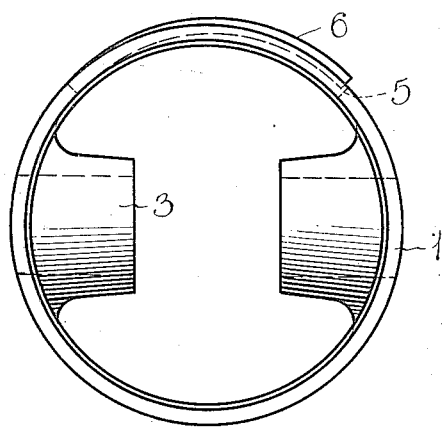

Figure 1 is an elevation of piston body in accordance with this invention; Fig. 2 is an end view of the same; Fig. 3 is a cross sectional view of a portion of the piston body as shown in Figs. 1 and 2, and Fig. 4 is a cross sectional view of a portion of a piston body illustrating a modification of my invention.

In the drawings, 1 denotes a piston body having the outer end thereof provided with circumferential grooves 2 adapted to receive pistons or packing rings of a conventional form (not shown). The piston body has diametrically opposed bosses or bearings 3 to accommodate a pin by which the piston body is connected to a connecting rod or pitman, and I have deemed it necessary to illustrate such connections.

The piston body 1, contiguous to the inner end thereof, is provided with parallel segment slits or slots 4 connected at one end by a longitudinal slit or slot 5, said slit or slot coöperating with the slits or slots 4 in providing a peripheral resilient take-up member 6 which has one end thereof integral with the body or skirt of the piston. The member 6 is sprung beyond the periphery of the piston and when the piston is placed in a cylinder, said member is retained under tension by a wall of the cylinder, consequently that portion of the piston diametrically opposing the member 6 will be snugly held in engagement with the wall of the cylinder. The member 6 is yieldable so as not to interfere with a reciprocatory movement of the piston in the cylinder, also to preclude excessive wear. The same result is obtained by the construction shown in Fig. 4, wherein the periphery or outer wall of a piston body 7 is provided with a segment recess 8 and in said recess is placed a resilient take-up member 9, in the form of a flat spring which protrudes beyond the periphery of the piston body and serves functionally the same purpose as the member 6.

In the preferred form of construction, the slits or slots 4 and 5 dissipate the heat of the piston and preclude excessive expansion and distortion, besides preventing carburization of the piston. In either instance, however, slapping of a piston in a cylinder is eliminated and consequently the efficiency of a gasolene engine or motor is materially increased.

What I claim is:—

1. As a new article of manufacture, a piston having the periphery thereof circumferentially slitted to provide a yieldable member having one end thereof integral with the piston and the opposite end adapted to protrude from the body of said piston.

2. A hollow piston adapted for reciprocation in a cylinder and having a side thereof intermediate its ends slitted to provide a member having one end integral with said piston and the opposite end sprung out and adapted to prevent piston slapping in the cylinder.

In testimony whereof I affix my signature in presence of two witnesses.

JOHN T. TRUMBLE.

Witnesses:
 KARL H. BUTLER,
 ANNA M. DORR.